ELECTRONIC COLOR VIEWER

Filed May 4, 1965

INVENTORS
ALEX W. DREYFOOS, JR.
GEORGE W. MERGENS

BY Curtis Ailes
ATTORNEY

Nov. 7, 1967 A. W. DREYFOOS, JR., ETAL 3,351,707

ELECTRONIC COLOR VIEWER

Filed May 4, 1965 3 Sheets-Sheet 2

United States Patent Office 3,351,707
Patented Nov. 7, 1967

3,351,707
ELECTRONIC COLOR VIEWER
Alex W. Dreyfoos, Jr., Port Chester, N.Y., and George W. Mergens, Wilton, Conn., assignors to Photo Electronics Corporation, Byram, Conn., a corporation of New York
Filed May 4, 1965, Ser. No. 453,144
29 Claims. (Cl. 178—5.2)

ABSTRACT OF THE DISCLOSURE

The disclosed invention relates to electronic viewers for color pictures, and particularly to viewers which are capable of providing a positive color representation, with adjustable color balance, of a conventional photographic color negative. In one embodiment there is provided a flying spot scanner arranged to scan the photographic original, and a photoelectronic pickup element arranged to receive the scanning information and to generate electrical signals in accordance therewith. A video amplifier is provided to receive the electrical signals and is connected to provide the amplified signals to a cathode ray picture tube. First and second filter elements are movably arranged to each provide a repeating sequence of color filters. The first color filter element is arranged to interpose the color filters in sequence between the flying spot scanner and the photoelectronic pickup element. The second color filter element is arranged to operate in synchronism with the first color filter element to interpose color filters over the face of the picture tube. A rotatable timing device is mechanically interconnected with the first color filter element and includes timing tracks for generating timing signals. The sweep circuits of the flying spot scanner and the picture tube are synchronized with the timing signals.

This invention relates to electronic viewers for color pictures, and particularly to viewers which are capable of providing a positive color representation, with adjustable color balance, of a conventional photographic color negative.

The viewer systems in accordance with the present invention are technically properly described as "television" systems since they convert optical information to electrical information and then reconvert the electrical information back to optical information. However, the results achievable with the present invention are so much better than the results normally associated wtih television systems, either of the closed circuit, or remote radio transmission types, that the systems of the present invention should not be classified with conventional television systems. Furthermore, in conventional television systems, the basic objective is generally to provide for the transmission of pictorial information over substantial physical distances. That is not the objective of the present invention.

The basic objective of systems such as that of the present invention is to provide a clear positive color picture representation, with adjustable color balance, directly from a photographic record of the pictorial information which does not have the correct representation of color values for pleasant viewing. For instance, the original may be a positive print with incorrect color values, or a color negative which must be reversed to a positive representation of color values as well as corrected for color values.

A particular object of the present invention is to provide a carefully calibrated and regulated electronic color viewer in which the color balance adjustments serve as print timing information for the control of photographic color printing apparatus.

A number of prior attempts have been made to produce electronic color viewers which are particularly intended for deriving color print timing information. For instance, U.S. Patent 2,863,938—Evans et al., shows such a system. However, it has been typical of all such prior systems that they have relied very heavily upon the conventional television system practice, with the result that such systems have been very complex and expensive.

By contrast, the electronic color viewer in accordance with the present invention is very simple, and yet it produces high quality results. The system simplicity carries with it a tremendous improvement in reliability and maintenance free operation, and a very impressive reduction in the cost of the system. For instance, very satisfactory electronic color viewers may be produced in accordance with the present invention at a cost which is less than one-third of the cost of prior systems constructed along the lines of that shown in the Evans patent. At the same time the invention provides certain important improvement features over such prior systems.

Prior electronic color viewer designs have usually been based upon the assumption that all of the color components, generally three in number, must be simultaneously sensed and transmitted and reproduced in order to achieve a satisfactory result. However, in accordance with one aspect of the present invention, it has been discovered that very satisfactory results in electronic color viewers may be achieved by means of a sequence color system which may employ rotating color filter masks, and that tremendous system simplification may accompany the adoption of the sequence system.

The color sequence system referred to herein is analogous in many ways to a color television system once developed in detail and demonstrated by the television engineering department of the Columbia Broadcasting System, Inc. of New York, N.Y. Descriptions of that system were published, for instance, in the proceedings of the Institute of Radio Engineers under the titles "Color Television—Part I" appearing in the April 1942 issue on pages 162 through 182, and "Part II" appearing in the September 1943 issue on pages 465 through 478. However, the electronic color viewers in accordance with the present invention are quite different, in many ways, from such prior sequence color television systems. Many of these differences may be described rather broadly by characterizing the systems of the present invention as integrated electronic color viewers in which the mechanical and electrical features of the system are more completely and intimately combined in function and structure than any similar prior system. The inventors have discovered that such integration and combination is possible, partly by recognizing that the objective of the system does not include the transmission of pictorial information over substantial distances so that the usual constraints of television systems do not necessarily apply.

Another object of the present invention is to provide an electronic color viewer having better color reproduction.

Prior electronic color viewers have generally been designed to accommodate only one size of photographic original, elaborate adjustments or modifications being required for accommodation of an original of a different size.

Another object of the present invention is to provide an improved electronic viewer which will quickly accommodate a wide range of sizes of photographic originals which are to be viewed.

Another object of the present invention is to provide an improved color viewer having a rapidly adjustable automatic "zoom" feature whereby an enlarged pictorial representation of a restricted portion of a photographic original may be inspected in detail. The portion to be enlarged and the corresponding degree of enlargement may be easily and continuously adjustable while maintaining substantially perfect focus and while the operator is viewing the pictorial output of the system.

Further objects and advantages of the invention will be apparent from the following description and the accompanying drawings.

In carrying out the invention in one preferred embodiment thereof, there may be provided a flying spot scanner arranged to scan the photographic original, and a photoelectronic pickup element arranged to receive the scanning information and to generate electrical signals in accordance therewith. A video amplifier is provided to receive the electrical signals and is connected to provide the amplified signals to a cathode ray picture tube. First and second filter elements are movably arranged to each provide a repeating sequence of color filters. The first color filter element is arranged to interpose the color filters in sequence between the flying spot scanner and the photoelectronic pickup element. The second color filter element is arranged to operate in synchronism with the first color filter element to interpose color filters over the face of the picture tube. A rotatable timing device is mechanically interconnected with the first color filter element for movement therewith, and includes timing tracks for generating timing signals. The sweep circuits of the flying spot scanner and the picture tube are connected for control in response to the timing signals and therefore in response to the rotation of the timing device.

Figure 1:
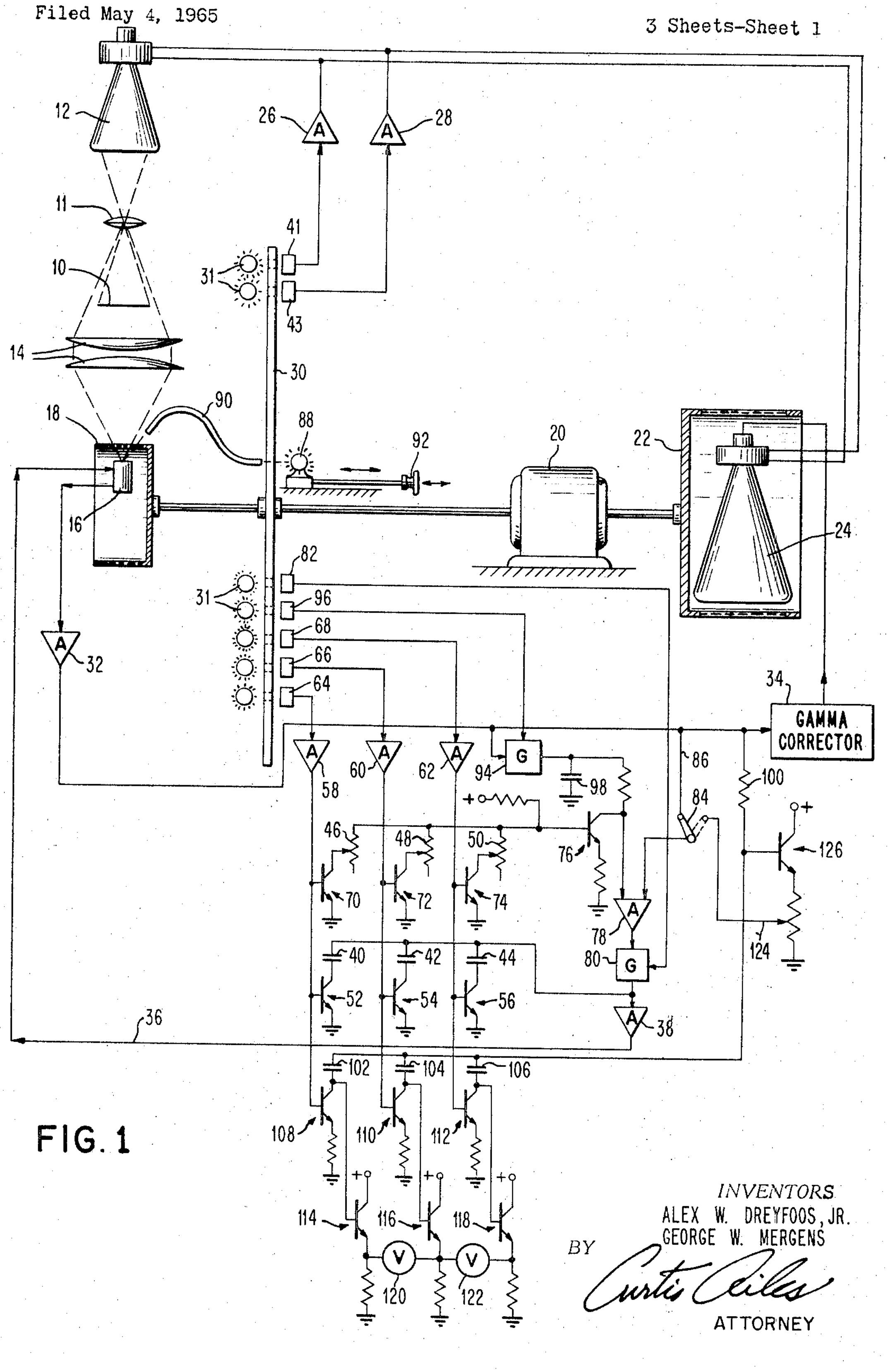
FIG. 1 is a simplified schematic representation of a preferred embodiment of an electronic color viewer in accordance with the present invention.
Figure 3:
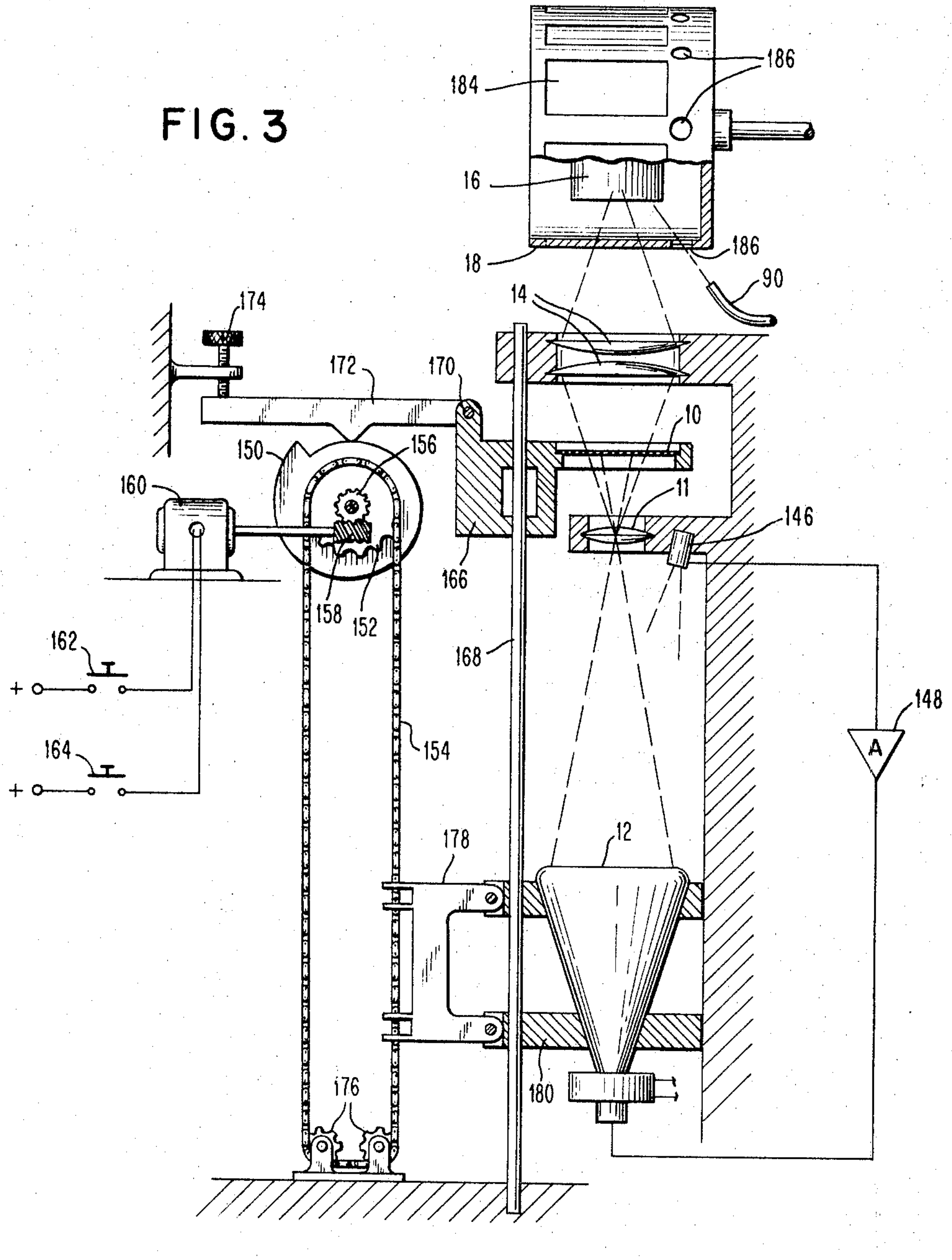

And FIG. 3 is an enlarged schematic of the flying spot scanner and photo-electronic pickup element and associated apparatus of the system of FIG. 1, illustrating various preferred details of construction.

The operation of the embodiment of the invention as shown in FIG. 1 may be briefly described as follows:

A color negative 10 which is to be viewed is scanned by a flying spot scanner 12, the beam being focused on the negative by an objective lens 11. The optical signals from the flying spot scanner 12, passing through lens 11, are focused by relay lenses 14 upon a photomultiplier tube 16. This illumination passes through a multiple color mask drum 18 which is rotated by a motor 20. A corresponding color masking drum 22 is also rotated in synchronism by the motor 20 for a picture tube 24.

Common sweep circuits including amplifiers 26 and 28 are provided for both the horizontal and vertical sweep signals for both the flying spot scanner 12 and the picture tube 24. The sweep signals for these common sweep circuits, and all of the other timing signals necessary for operation of the system are provided from a timing element 30 which is fastened to and rotates with the shaft of the motor 20. Thus, the timing is mechanically synchronized with drums 18 and 22. The timing element 30 is illustrated as a perforated disk which provides for the passage of light signals from lamps 31 through slotted perforations to various photo-transistors for accomplishing the electrical timing function. The electrical picture signals picked up by the photo-multiplier tube 16 are amplified by video-amplifier 32, and gamma corrected in a gamma corrector 34 before being supplied to the picture tube 24. The gain of the photo-multiplier tube 16 is controlled by the voltage to its dynodes supplied through connection 36 from the dynode amplifier 38. This gain is sequentially changed for each sequence of picture scans through the three different color masks in order to adjust the output to the requirements of the three color values recorded on the negative 10. These adjustments are accomplished by means of voltages stored upon the three capacitors 40, 42, and 44 which are sequentially switched to provide the input control voltage to the dynode amplifier 38.

The flying spot scanner 12 is a conventional cathode ray tube flying spot scanner, preferably of a type having a very short persistance white phosphor. The flying spot is imaged by the objective lens 11 upon the color negative 10. The condensor lens system, including lenses 14, focuses the aperture of lens 11 to substantially a spot on photomultiplier tube 16. Each of the color mask drums 18 and 22 have twelve color mask frames arranged in four repeating sequences of red, green and blue filters. A different number of sequences can be provided if desired.

The timing disk 30 contains timing track apertures for the phototransistors indicated at 41 and 43 to control the horizontal and vertical sweep generators 26 and 28 to provide a separate cathode ray tube raster field each time one of the color filters of each of drums 18 and 22 are respectively positioned over the photo-multiplier tube 16 and the picture tube 24. Thus, the photo-multiplier tube 16 generates an electrical signal which is a record of the red transmission of the color negative 10 each time a red filter of the drum 18 is positioned in front of the photomultiplier tube. The following field generates a record of the green transmission of the color negative, and the next following field a record of the blue transmission of the color negative. This three-color sequence is repeated continuously and the resultant electrical signals are amplified and high-frequency peaked in the amplifier 32. The high frequency peaking is carried out by conventional means consisting basically of high pass filters and the most important purpose is correcting for phosphor persistence and aperture effects. Linearity corrections are made to the signal from amplifier 32 by passing it through the gamma corrector 34, and then on to the picture tube 24. The gamma corrector is constructed along conventional lines except that the linearity corrections are selected to compensate for the combination of the non-linearity in the responses of the display cathode ray tube 24 and the nonlinearity in the color print material which the color negative would normally be printed onto, and in any of the other optical or electrical components between the negative 10 and the optical output to be viewed through the filters of drum 22.

In the signal path including amplifier 32, the polarity of the signals is electrically reversed so that the picture represented by the color negative 10 can be viewed as a positive picture at the picture tube 24. This polarity reversal can also be referred to as a phase reversal since it means that an increasing optical energy signal received by the photomultiplier tube 16 results in a decreasing illumination intensity output at the same instant from the display cathode ray tube 24, and vice versa.

The color recorded in the color negative 10 which is detected by the photo-multiplier tube when scanned through the red filter of drum 18 is called "cyan." This color is sometimes referred to also as "minus red," since it is the complement of red. The cyan image recorded on the color negative is for the purpose of recording the red image information. When scanned through the red filter, the variations of intensity of the cyan color on the negative are detectable by the photo-multiplier tube 16. The other two color components recorded on the color negative are magenta and yellow. The red filter essentially excludes variations in light intensity signals caused by the magenta and yellow color component signals of the color negative. The magenta color component of the negative records the green color information and is primarily detectable when scanned through the green filter of drum 18. Similarly, the yellow negative color is primarily detectable when viewed through the blue filter of drum 18. Each of the red, green, and blue filters of drum 18 are preferably chosen carefully so that the combined maximum pass band of the color spectrum formed by the combination of the illumination produced by the phosphor, the spectral sensitivity of the photo-multiplier tube, and the color filter, match the peak color absorption spectrum of the associated negative color. This should generally correspond to the peak of sensitivity of the color print material which is to be used to produce color prints. Matching the peak sensitivity of the color print material is actually the most important consideration. Thus, the green filter, in combination with the remainder of the system, should preferably match the sensitivity peak of the magenta layer of the color print material.

The color filters of the drum 22 are in exact phase and correspondence with the color filters of drum 18. Thus, whenever a red filter is presented before the photo-multiplier tube 16, a red filter is also presented in front of the picture tube 24. This is proper because the red picture information is detected from the negative 10 while the negative is scanned through the red filter of drum 18, and this same red information is displayed at the same time at the picture tube 24. The selection of the exact spectral hues of the color filters of the drum 22 is not quite so important or critical to the operation of the apparatus as is the selection of the scanning filters for drum 18. The basic reason for this is that the color reproductions generally made from color negatives are of the subtractive color type whereas the apparatus being described is of the additive color type. Almost any set of red, green and blue filters in an additive system that yield a white color balance when the picture tube 24 is at a constant brightness, will give a higher degree of color purity than the best dyes available for a subtractive color system. However, where the apparatus is used for the particular purpose of determining color print exposure constants, careful selection of the hues of the display filters of the drum 22 may be employed to enhance the "match" between the calibration of the machine and the photographic properties of the color print materials.

Since the filter drum 22 for the picture tube 24 is continuously revolving, and does not stop for each color scan operation, the sweep of the picture forming cathode ray raster is preferably carried out in the same direction across the face of the picture tube 24 as the direction of progress of the color filters of the filter drum 22. Thus, for instance, the cathode ray deflection circuits provide for a single slow sweep across the face of the tube on one axis and a plurality of sweeps on the other axis to cover the area of the picture scan. Accordingly, the single slow sweep of the cathode ray spot is preferably carried out in the same direction across the face of the picture tube 24 as the direction of progression of the color filters. This assures that the color filter aperture will not interrupt part of the picture.

The gain of the system (which controls the density and color balance of the display) is individually adjustable for each of the three color fields by adjusting the gain of the photo-multiplier tube. The actual adjustments are accomplished by the three variable resistors 46, 48, and 50, by which the voltages upon capacitors 40, 42, and 44 are determined. Control of the gain of the system for this purpose is accomplished by controlling the input signals to the dynode amplifier 38 in a sequence corresponding to the colors, and in accordance with the voltages stored upon the capacitors 40, 42, and 44. The voltage thus provided by the dynode amplifier 38, through connection 36, controls the gain of the photo-multiplier tube 16. The sequential switching of the capacitors 40, 42, and 44 to control amplifier 38 is accomplished by the transistors 52, 54, and 56 under the control respectively of amplifiers 58, 60, and 62. These amplifiers are controlled by appropriate slotted timing tracks of the timing disk 30, through phototransistors 64, 66, and 68. These color timing signals from amplifiers 58, 60, and 62 are also employed, through the medium of switching transistors 70, 72, and 74, to sequentially switch electrical signal values representative of the adjustments of the variable resistors 46, 48, and 50 through a transistor 76 to an amplifier 78. Signals based upon these adjustments are periodically gated from the output of amplifier 78 through a gate 80 to thereby vary the charge voltages upon capacitors 40, 42, and 44. The opening of the gate 80 is accomplished only during a short interval prior to each raster scan operation of the scanner 12 by another timing track of disk 30, and a phototransistor 82.

The amplifier 78 is a differential amplifier producing an output representing the difference between the signals derived from input transistor 76 and signals supplied through switch 84. When switch 84 is in the position shown, the signals are provided through connection 86 from the output of the video amplifier 32. The signal available to connection 86 from the video amplifier 32 during the brief interval when the gate 80 is opened is a very special signal. It is derived from an optical signal provided from a reference lamp 88 which shines through an aperture track of the timing disk 30 to an optical filament light pipe 90 which conveys the illumination to the photo-multiplier tube 16. The filter drum 18 includes a small color filter window arranged between each adjacent pair of main color filter windows through which the reference light from light pipe 90 passes on its way to photo-multiplier tube 16. The color of these auxiliary filters corresponds in each case to the next succeeding scanning filter color. The combination of the differential amplifier 78, which compares the signals determined by the settings of the color adjustment resistors 46, 48, and 50 with a standard illumination from a reference lamp 88, provides for a standardization and continued uniformity in the calibration of the apparatus. For this purpose, the output illumination of reference lamp 88 must be held constant. A satisfactory method for achieving this requirement is to employ an incandescent filament lamp, operating it at a carefully regulated voltage which is well below the voltage for which it is rated.

The illumination from the lamp 88 may be intentionally and controllably varied to accomplish a very useful result. Thus, the lamp may be physically moved either to the right or to the left, as illustrated in the drawing, to decrease or increase the illumination received at the light pipe 90, the movement being accomplished by means of a schematically represented handle 92. The useful result achievable by this adjustment is to vary the gain of the photo-multiplier tube 16, through the medium of the differential amplifier 78 and the dynode amplifier 38, on an overall basis for all colors, so as to vary the overall intensity of the picture as reproduced at the picture tube 24. Thus, the variation in the intensity of illumination from the reference lamp can be calibrated as another variable in producing color prints from the color negative 10. It will be understood, of course, that the illumination from reference lamp 88 may be varied in other ways in addition to physical movement of the lamp. For instance, a variable opacity mask may be adjustably positioned between the lamp 88 and the light pipe 90, or the lamp filament may be imaged on the light pipe with a variable aperture lens.

The outer boundary of the raster scan of the scanner tube 12 is preferably constricted on all four sides, either electrically, by reducing the beam intensity to essentially zero, or preferably by providing an opaque mask either upon or adjacent to the face of the flying spot scanner tube 12. This black border or "frame" around the picture is optically reversed with the colors by the electrical reversal of polarities within the system, and displayed as a white border for the picture at display tube 24. This white border provides a good optical reference for the viewer in evaluating the color qualities of the picture as it is viewed. This has been found to be a very valuable feature. This border signal also provides valuable optical and electrical reference level information for standardization, calibration, and stabilization of the system. For instance, at the end of each raster scan, when the flying spot scanner is blanked out by the border, there is a zero optical input to the photo-multiplier tube 16. Therefore, during this particular interval, the video amplifier 32 has an output which is particularly characteristic of a zero optical input condition. This particular output of amplifier 32 is gated through a gating device 94 under the control of another phototransistor 96 responding to an appropriate aperture timing track of disk 30. This signal through gate 94 is stored on capacitor 98 to serve as a standardized "white reference" voltage for the color control signals transmitted from the resistors 46, 48, and 50 through the transistor 76. The signal provided through gate 94 to capacitor 98 is referred to as a "white reference" signal because it corresponds to a white boundary of the display provided by picture tube 24.

A feature which may be provided in the system in accordance with a preferred embodiment of the invention includes a color signal integration circuit having a charging resistor 100 connected to place charges on capacitors 102, 104, and 106. These respective charges correspond to the average video signal levels for the different colors as evidenced by the output of the video amplifier 32 during the transmission of the respective color fields. The capacitors 102, 104, and 106 are sequentially connected in circuit with the charging resistor 100 coincidentally with the scanning of the respective color fields by means of the transistors 108, 110, and 112 which are respectively connected for control in response to the color field timing signals from amplifiers 58, 60, and 62. The lower terminals of these capacitors are respectively connected to the base electrodes of transistors 114, 116, and 118 to thereby control the conductivity of these transistors. Null indicating voltmeters 120 and 122 are connected respectively between the load resistors of transistors 114, and 116, and between the load resistors of transistors 116, and 118. While the voltages at the lower terminals of the capacitors 102, and 104, and 106 may vary somewhat by reason of the various capacitor charges, and the commutation operations of the associated transistors 108, 110 and 112, nevertheless, the voltage charge difference, for instance, between capacitor 102, and 104 will remain substantially constant. Because of the arrangement of these circuits, the voltmeter 120 will essentially sense this voltage charge difference in relation to the common connection of the upper terminals of capacitors 102, and 104. This voltage difference value will remain substantially constant between the two sides of voltmeter 120, even though the potentials at the two terminals of the voltmeter may also be fluctuating up and down together due to the commutation switching of transistors 108, and 110. The voltmeters 120, and 122 are preferably null voltage devices and they are very useful, particularly for an inexperienced operator of the machine, to provide a starting point in adjusting the color adjustment resistors 46, 48, and 50 to obtain a generally pleasing color balance. Without the null meters 120 and 122, the operator may observe that the color balance of the picture as displayed is unsatisfactory, but he may not know quite how to proceed to adjust the color balance resistors to achieve the desired corrections. The null meters serve the function of giving the operator an appropriate starting reference point, since it has been found that if the integrated values of the three color video signals are made equal, the color balance will generally be pleasing and close to the ideal balance. Another helpful operating procedure relating to this problem is to maintain one of the color resistors, such as 46, in a fixed mid-position adjustment, and to attempt to accomplish the entire color balance operation by adjusting the other two resistors 48, and 50.

When the apparatus is to be employed merely as a color picture viewer, and where exact calibration and standardization of the color and picture intensity adjustments is not essential, the integrated color reference signal stored on capacitors 102, and 104, and 106 may be employed to establish the reference signal for the differential amplifier 78. This is accomplished by shifting the switch 84 to the right position (shown dotted) to connection 124. The signals from capacitors 102, 104, and 106 are supplied to connection 124 through a transistor 126 and the associated load potentiometer. By using these integrated color outputs as the reference signal for differential amplifier 78, the display automatically assumes a generally pleasing color balance and ideal color adjustments are more quickly and easily achieved, although they are not standardized and calibrated.

When the circuit including transistor 126 is employed to provide the reference voltage potential, the adjustment of overall intensity of the picture is accomplished by adjusting the load potentiometer of the transistor 126 at 124. For convenience, the adjustable potentiometer connection 124 is preferably mechanically interconnected for movement with the adjustment handle 92 for the reference lamp 88. Thus, the same operator's control may be employed to accomplish the picture intensity adjustment whether the intensity reference signal is derived from the reference lamp 88, or from the charges on the integration capacitors 102, 104, and 106.

An electrical measurement of the integrated overall intensity level of the picture is available, if desired, by connecting a voltmeter to sense the common voltage level at the upper terminals of the integrating capacitors 102, 104, and 106. This is effective whether the reference voltage is derived from this source or not.

The null indicating voltmeters 120 and 122 may preferably by physically arranged upon the control panel of the system respectively between the control knobs for resistors 46 and 48 and between the control knobs for resistors 48 and 50, so that it is quite obvious as to which controls should be adjusted to achieve a null balance condition.

Figure 2:
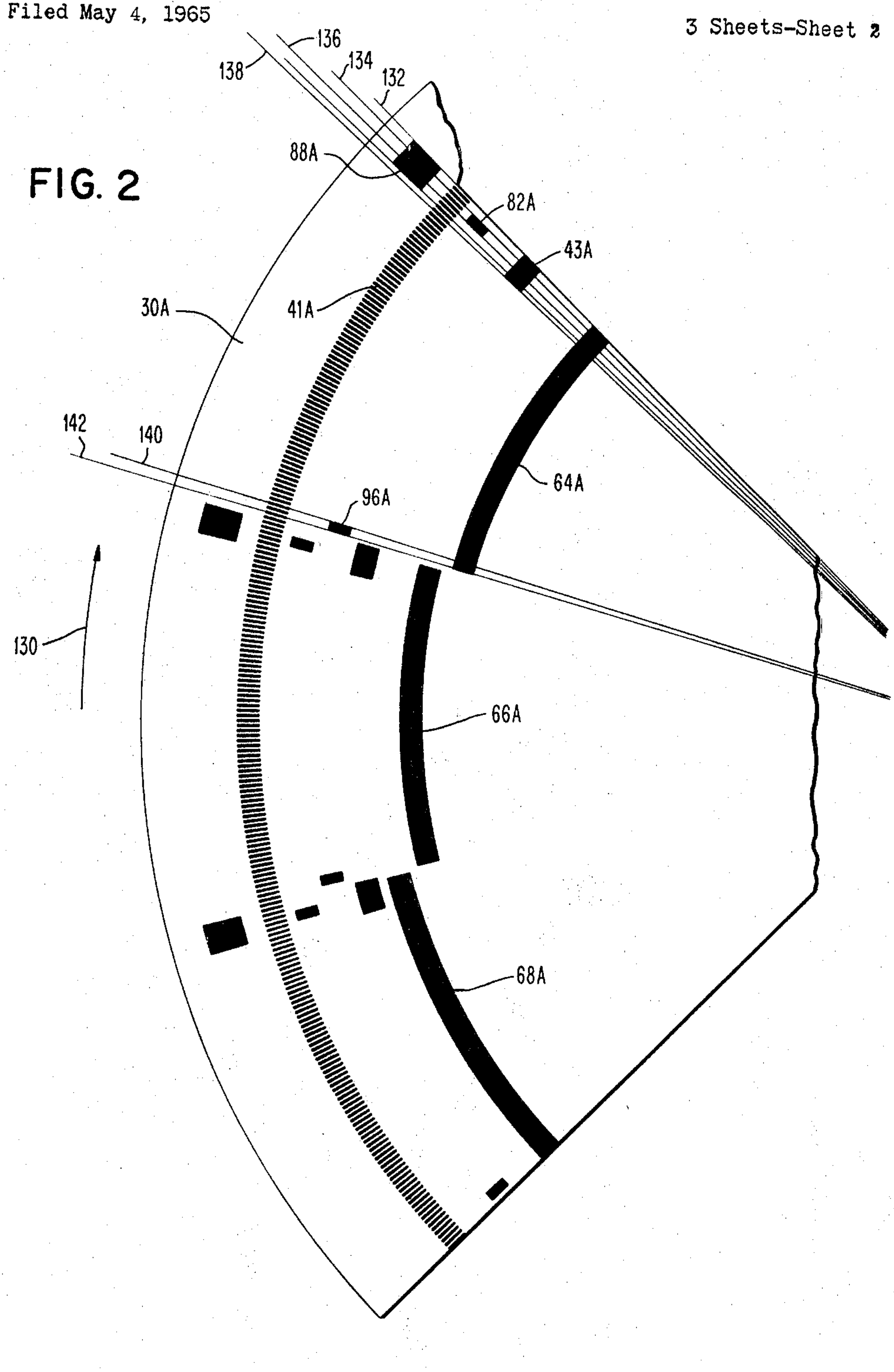
FIG. 2 is a representation of a segment of the basic timing element disk of the system of FIG. 1.

FIG. 2 is an exact representation of a ninety-degree segment of an apertured timing disk suitable for employment in a system in accordance with the present invention and corresponding to the timing disk 30 schematically illustrated in FIG. 1. The various timing tracks obviously may be arranged in any convenient order upon the disk. The order of the tracks shown in FIG. 2 does not correspond exactly with the order represented in the schematic diagram of FIG. 1. The outer track of FIG. 2 is for the reference lamp apertures 88A for the reference lamp 88. For convenience and clarity, all of the other track apertures illustrated in FIG. 2 are identified by numbers corresponding to the associated photo-transistors of FIG. 1, but with the suffix "A" added. Thus, the horizontal raster sweep track apertures are shown at 41A, the vertical at 43A, the three color control track apertures at 64A, 66A, and 68A, the reference lamp gate signal track apertures at 82A, and the white reference gate signal track apertures at 96A. It will be understood that the entire timing disk simply consists of four quadrants identical to the single quadrant illustrated in this figure.

The timing of the operation of the system of FIG. 1 will now be described in relation to the apertures illustrated in FIG. 2. The direction of rotation of the disk as illustrated in FIG. 2 is to be clockwise, as indicated by the arrow 130. Thus, the switching functions accomplished by the various apertures are timed in accordance with the aperture spacings proceeding downwardly from the top of the figure. These various spacings have been identified by radius lines which have been added in the figure only for convenience in explaining the timing relationships.

At the starting time for the cycle of a particular picture scan, as illustrated by radius line 132, each of the following apertures open: the color gate aperture 64A, the reference lamp aperture 88A, and the vertical sweep timing aperture 43A. Upon receiving the signal occasioned by aperture 43A, the vertical sweep amplifier 28 is operable to blank out the cathode ray beams in both the scanner 12 and the display tube 24, to return the beam vertical deflection circuits to the top of the raster scan pattern, after just having previously completed a vertical scan from top to bottom. The blanking aperture 43A preferably opens before the reference lamp aperture 88A so that the reference lamp signal does not become part of the displayed picture. After the reference lamp aperture 88A is fully opened to the lamp 88, and the color gate control by aperture 64A fully on, and during the blanking of both cathode ray tubes by the vertical sweep signal from aperture 43A, a short reference gate signal is provided by aperture 82A, as defined by radii 134 and 136. By the time indicated by radius 138, the reference lamp aperture 88A has been closed, and the vertical return sweep and blanking functions accomplished by the vertical sweep aperture 43A are ended. Scanning and display of the picture then proceed, the rapid horizontal scans being controlled by the short apertures of track 41A. At the end of the cycle for this particular frame, during scanning of the "white border," the white reference gate signal is provided by aperture 96A during the interval indicated between radii 140 and 142.

The cycle just described is then substantially repeated, the only difference being that a different color gate represented by aperture 66A is opened. After another repetition of the frame scan cycle, with the third color gate represented by aperture 68A opened, the cycle is again repeated with the first color as the disk continues to rotate into the next quadrant. While the system has been described with reference to an embodiment having twelve scanning frames per revolution, it will be quite apparent that the system may be designed to have a different number of frames per revolution if desired.

It is a particularly interesting and useful feature of the invention that even the rapid horizontal scanning function is controlled and timed by an aperture track 41A of the aperture disk 30. The horizontal sweep amplifier 26 preferably includes an input circuit which is tuned to resonate at the frequency to be expected from the track 41A at the usual speed of disk rotation. This tuned input circuit therefore operates very much as an oscillator except that it is not truly capable of self-sustaining oscillations which persist for more than a few cycles. Thus, the actual frequency of oscillation is completely and precisely controlled by the track 41A. The input frequency provided by track 41A is conveniently doubled so that the number of horizontal scans per frame is precisely twice the number indicated by the frequency of the apertures in track 41A. If desired, a second doubling of frequency, or a higher order multiplication of frequency, may be employed to provide a higher number of horizontal scans per frame, and completely synchronized with the rotation of the timing disk 30 and the two color filter drums 18 and 22.

The unusual and straightforward synchronization of the two cathode ray tubes 12 and 24 by employment of common sweep circuits including amplifiers 26 and 28 provides some extremely interesting and valuable advantages. For instance, it is not absolutely essential that the sweeps are carried out in a precisely linear manner, or at a precisely controlled speed, for the position of each spot in the scanning of the negative 10 will be precisely reproduced in the display of the display tube 24. This results because the scan position of the raster of display tube 24 will be positioned precisely with the raster of the scanner tube 12 as it scans that particular spot.

Furthermore, since the control of all of the deflection circuits, and all of the necessary timing and synchronization signals is from a single timing disk 30 driven together with the filter drums from a single electric motor 20, they are completely synchronized in operation. Thus, the speed of the motor 20 may actually vary over a substantial range without losing synchronism, and without any truly substantial impairment of results. As a practical matter, in order to obtain optimum performance from the system and to assure a reasonable match of the speed of the timing disk 30 with the tuned input circuits of the horizontal sweep amplifier, it is preferred that a reasonably constant motor speed should be maintained. Accordingly, it is preferable to employ a synchronous motor for the drive motor 20. However, this is generally not necessary. The motor load does not vary, and this factor does not cause speed fluctuations.

The number of horizontal sweeps provided by a horizontal sweep circuit 26 under the control of track 41A is preferably comparable to the number of horizontal sweeps employed in commercial television picture transmission. Preferably, the present system also employs the usual interlace sweep system such that the horizontal sweeps for each successive raster scan are vertically displaced by a distance equal to one-half of the spacing between adjacent horizontal sweeps of a single scan. Thus, the horizontal sweeps of each scan are interlaced between the horizontal sweeps of the last previous raster scan, and the result is a picture which appears to have twice as many horizontal sweeps as each frame provides. In the present system, since the scans for the different colors are interlaced with one another, a truly complete color picture with all three colors represented on both interlace scan patterns requires six scanning frames corresponding to one-half of a full revolution of the motor 20 and the filter drums 18 and 22.

It is apparent from the preceding explanation that the display apparatus including the picture tube 24 and the color filter drum 22 provide a three-color display in terms of a repeating sequence of red, blue, and green "pictures." When the system is operated at a sufficient speed, generally in excess of forty-eight of the three-color sequences per second, and preferably sixty of the three-color sequences per second (one-hundred eighty total fields per second), the persistence of the color fields in the eye of the viewer provides the visual effect of a stationary full color image. The preferred speed on one-hundred eighty total fields per second corresponds to a rated speed for motor 20 of nine hundred revolutions per minute.

While the system of FIG. 1 is illustrated with both of the drums 18 and 22, and the timing disk 30 mounted directly to the shaft of the motor 20, it is obvious that the common shaft could be driven by the motor through speed change gearing or belts, and that further flexibility in the design and arrangement of the components is also possible by driving these rotating components by one or more separate geared or belted connections to the motor 20. It may also be convenient, for instance, to provide for half as many color filters in the drum 18 as there are in the drum 22, and to drive drum 18 at exactly twice the speed of the drum 22. Thus, the speeds of the drums 18 and 22 and the timing disk 30 need not necessarily be identical as long as they are exactly related and synchronized for appropriate operation of the system. Preferably, they are exactly mechanically synchronized through gear drives, chain drives, or serrated non-slip drive belts.

It will also be obvious that, while direct mechanical interconnection for the two drums 18, 22, and the timing disk 30 is preferred, if it is necessary to have the display tube 24 and the associated drum 22 physically removed some distance from the remainder of the system, the drum 22 may be driven by a separate electric motor which is electrically locked to rotate at the exact speed and in exact phase with motor 20.

The gamma corrector 34 is basically a voltage level responsive apparatus. Accordingly, in order to achieve a correct result, the input voltage signal to the gamma corrector from the video amplifier 32 must be stabilized at some reference level. Thus, the information signals must be variations from a carefully controlled reference level. In order to accomplish this, the white reference level signal from transistor 96 is used to gate the output of video amplifier 32 to another capacitor (not shown) in addition to capacitor 98. This video amplifier white reference voltage is then compared to a standardized regulated voltage in a differential amplifier (not shown), and the output of the differential amplifier is used as a feedback signal to the video amplifier to stabilize the operation of that amplifier at the required reference level. Thus, the correct operation of the gamma corrector 34 is assured.

While not illustrated in FIG. 1, the system of the present invention preferably includes a brightness level control for the display cathode ray tube 24. This preferably consists of a photocell having a light gathering lens system focused to sense a portion of the white boundary region of the picture display. An amplifier is connected for operation under control of the photocell output, and arranged to adjust the overall brightness of the display tube 24 to compensate for variables such as the age of the tube, or various other factors which may influence the brightness level of the tube output. The components of this brightness level servo-system are omitted from FIG. 1 on order to promote clarity in the representation of the remainder of the system.

A similar brightness level servo-system is preferably provided for the flying spot scanner cathode ray tube 12, and it is also omitted from FIG. 1, but it is schematically illustrated in FIG. 3.

FIG. 3 is an enlarged schematic view showing the flying spot scanner 12, the photo-multiplier tube 16, and the associated apparatus of FIG. 1 in greater detail. In FIG. 3, the components have been inverted so that the scanner 12 is shown at the bottom and the photo-multiplier tube 16 at the top of the figure. This arrangement is actually the preferred arrangement of the apparatus. The arrangement of FIG. 1 was used primarily for clarity and simplicity in illustrating the system.

As mentioned above, the brightness of the flying spot scanner 12 is preferably stabilized by a control loop including a photocell and an amplifier. This is illustrated in FIG. 3 in which a photocell 146 is shown mounted very near to the objective lens 11 and therefore arranged to receive essentially the same illumination. The electrical signal of this photocell 146 is connected to control the amplifier 148, which is then connected to control the brightness of the flying spot scanner 12. Thus, the output of the scanner 12 is stabilized and compensated for any of the many variables which may affect this output, including aging of the tube, accumulation of dust on the tube face, and so forth. This automatic brightness control is also particularly important for the "zoom" feature which is described immediately below.

The system of FIG. 1 may be operated very satisfactorily with all of the components of the scanner system in relatively fixed positions. This includes the scanner 12 and the photo-multiplier tube 16, and all of the optical components arranged between them. However, in accordance with another feature of this invention, a "zoom" effect may be achieved for viewing close-up (enlarging) any desired reduced area of a negative. This is accomplished in accordance with this feature of this invention by a coordinated vertical movement of both the negative 10 and the scanner 12, while maintaining all of the other optical elements of the scanner fixed. This coordinated movement may be accomplished by means of a cam 150 for positioning the negative 10, and a sprocket wheel 152 driving a chain 154 to position the flying spot scanner 12. The cam 150 and the sprocket 152 are preferably driven by a common shaft through speed reduction gearing, illustrated by worm drive gear 156 and worm 158, by means of a motor 160. The motor 160 may be controlled for forward or reverse operation by means of push buttons 162 and 164 to thereby achieve an automatic powered "zoom" adjustment. The cam 150 is designed to provide for perfect focus for all positions of rotation.

The vertical movement of the negative 10 is accomplished by means of a frame 166 which supports the negative 10 and which is reciprocably mounted upon a fixed alignment tube 168. Several such tubes are preferably provided in order to maintain perfect alignment. The frame 166 is supported and vertically positioned by means of a pivotal connection at 170 to a cam follower lever 172 which follows the surface of the cam 150. In order to obtain fine focusing adjustment, the fulcrum of the cam follower lever 172 is adjustably positioned by means of a set screw 174.

The chain 154 is maintained in the desired position by means of idler sprockets 176. The chain 154 is connected for vertical support and movement of the scanner tube 12 by means of a connection yoke 178 and a slidable supporting frame 180. The frame 180 is also guided by the fixed tube 168, and preferably by several such tubes, in order to maintain the alignment of the scanner tube 12 regardless of its vertical position.

The "zoom" feature is obviously quite valuable, particularly where the apparatus is employed for determining the appropriate information for correct color printing. A restricted portion of a negative which contains critical parts of the picture for color balance purposes can be magnified and inspected in greater detail. It is obvious, however, that this feature is also very valuable merely for viewing the negative and for obtaining information therefrom.

The "zoom" feature offers an electronic magnifier or enlarger for the information contained upon the negative. It is quite obvious that the system can be easily designed, and preferably is designed, to provide for at least some enlargement in size of the picture presented by the picture tube 24 over the size of the negative 10. When desired, very large ratio magnification can be built into the system so that the system affords a convenient arrangement for very detailed analysis of photographically recorded information. Most known prior systems for accomplishing the purposes of the present system have been designed primarily to accommodate a single size negative. However, the present system, with the "zoom" feature, will accommodate, by means of the "zoom" adjustment, for a negative of virtually any size.

The illumination control amplifier 148 is particularly important in connection with the "zoom" feature because the illumination delivered at the objective lens 11 decreases as the scanner tube 12 is moved downwardly and farther away from the lens, and conversely increases as the tube is moved upwardly towards the lens 11. The brightness control amplifier 148 thus controls the brightness of the scanner tube 12 in accordance with the optical signals received by photocell 146 to maintain the illumination level at the objective lens 11 substantially constant. In this manner, the illumination level received by the photo-multiplier tube 16 is substantially unvarying despite the changes provided by the "zoom" feature. This stabilization is obviously important for a calibrated system.

It is a particularly interesting aspect of the "zoom" feature of the invention that, while the tube 12 and the negative 10 are moved in a coordinate manner for maintaining the raster scan always in focus upon the negative, the condenser lenses 14 need not be moved, for they focus from the center of objective lens 11 to the photo-multiplier tube 16, both of which are fixed.

Another feature of the invention which is illustrated in FIG. 3 is the arrangement of the color filters of the drum 18. As mentioned above, the drum 18 not only includes main filters, such as indicated at 184, but also auxiliary filter windows or apertures, as indicated at 186, to be interposed in the path of the illumination from the reference lamp transmitted through the light pipe 90 to the photo-multiplier tube 16. The system will operate without separate color filters for each reference, however, by having the reference filter the color of the next scanning filter, the reference system will automatically correct for any photo cathode sensitivity changes that are selective to color. For example, as the photo cathode increases in temperature, the red sensitivity increases whereas the blue sensitivity has almost a zero temperature coefficient.

One of the advantages of the present invention is that it provides picture reproductions for viewing at the viewing tube 24 which are more pleasing to the eye than positive color prints. The colors of the picture are more lively. This is due to the fact that the color controls of the system of the present invention are operable to increase the brightness of a particular color whenever additional color intensity is called for. Thus, the brightness of a particular spot projected by the cathode ray beam of display tube 24 is increased during a red scan if increased red intensity is called for at that particular spot. This differs somewhat from the production of color prints. In the production of positive photographic color prints, the intensity of a particular color, such as the intensity of a red spot, is essentially increased by decreasing the other two color components, rather than increasing the red. It is for this reason that the viewer of the present invention provides a more pleasing reproduction of a color photograph. This difference between the mode of operation of the viewer and color positive printing generally does not create any serious problem in employing the system of the present invention to obtain color print processing calibration information.

It is one of the most important features and discoveries of the present invention that useful color print timing data is available from the system despite the abovementioned difference between the operation of the present system and the color control effects in actually producing a color print.

However, where color intermix signals are regarded as important to the achievement of proper color print exposure information, in accordance with another feature of the present invention, a magnetic recording head is provided upon the timing disk 30 and connected to record continuously the video signal from the video amplifier 32. A magnetic erase head is preferably provided just ahead of the magnetic recording head to erase the last previous information. In this way, magnetic signals representing each color frame scan are recorded in detail upon the timing disk. Separate magnetic reading heads are then provided at various spaced positions around the magnetic recording track in order to pick up the color frame information for each color in synchronism with a different color scan. The picked up color information is then mixed through appropriate mixing networks with the color which is being scanned. The read heads and the channels to which they are connected are appropriately gated by the color gating signals from the amplifiers 58, 60, and 62. In the way, the sequences of color frame scanning signals are placed on an instantaneous time basis for correct intermixing. For instance, during a red scan, the data recorded on the magnetic track from the last previous blue and green scans (of the proper interlace) are read from the track and intermixed appropriately with the red scan signal. Similarly, during the blue scan, red and green frame scan signals from previous red and green scans are read and intermixed with the blue scan signal, and so forth.

It is apparent that various mechanical and electrical modifications can be made without departing from the spirit of the present invention. For instance, either or both of the color filter drums 18 and 22 may be constructed as a filter disk rather than a filter drum, and either or both of the color filters may be mechanically combined with the timing disk 30. Furthermore, the timing disk 30 may be constructed as a drum rather than as a disk. The drums and disks may be referred to generally herein as "wheels."

The timing signals carried by the disk 30 may be recorded by means other than apertured tracks. For instance, the information may be recorded in terms of magnetic tracks, or variations in the physical surface features of the disk which could be detected by suitable pickup devices. Another obvious alternative is simply to employ a disk composed of a combination of conductive and insulating materials, and commutator brushes to pick up the signals from the various conductive segments of the tracks. However, the aperture tracks with optical pickups are preferred. While the aperture tracks of the disk 30 have been referred to in some instances above as "slots" and "slotted timing tracks," it will be understood that the optical aperture effect may be obtained without having an actual opening in the disk. Thus, the disk may be basically an opaque body with transparent portions for the optical apertures. Reflective optical systems are also possible in which the timing disk is opaque to the transmission of light, but the timing tracks are recorded in black and white or reflective and non-reflective patterns.

While this invention has been shown and described in connection with a single preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

What is claimed is:

1. An electronic color viewer for presenting a color representation of pictorial information contained on a color original comprising a cathode ray flying spot scanner arranged to scan the color original, a photo-electric pickup element arranged to receive the scanning information and to generate electric signals in accordance therewith, a cathode ray picture tube, first and second color filter wheels, said first color wheel being operable to interpose color filters in sequence between said flying spot scanner and said photo-electric pickup element, said second color wheel being mechanically connected for rotation with said first color wheel to interpose color filters in sequence over the face of the picture tube, a video amplifier connected to control the intensity of the beam of said picture tube in accordance with the output of said photo-electric pickup element, a timing device connected for rotation with said color wheels for movement in synchronism therewith, said timing device including timing tracks for generating timing signals, signal pickup elements associated with said timing tracks and connected for the operation of the sweep circuits of both said flying spot scanner and said picture tube in response to movement of said timing device.

2. An electronic color viewer for presenting a positive color representation of pictorial information contained on a photographic color negative comprising a cathode ray flying spot scanner arranged to scan the color negative, a photo-electronic pickup element arranged to receive the scanning information and to generate electric signals in accordance therewith, a cathode ray picture tube, first and second color filter wheels each including a repeating sequence of color filters circularly arranged therein, said first color filter wheel being arranged for rotation and operable to interpose color filters in sequence between said flying spot scanner and said photo-electronic pickup element, said second color filter wheel being mechanically connected with said first color wheel for rotation in synchronism with said first color wheel and operable to interpose color filters in sequence over the face of the picture tube, a video amplifier connected for operation in response to the output of said photo-electronic pickup element and connected to control the intensity of the beam of said picture tube in accordance therewith, a rotatable timing device mechanically interconnected with said first color filter wheel for rotation therewith, said timing device including timing tracks for generating timing signals, signal pickup elements associated with said timing tracks and connected for the operation of the sweep circuits of both said flying spot scanner and said picture tube in response to rotation of said timing device.

3. A color viewer for presenting a positive color representation of pictorial information from a color negative comprising a cathode ray flying spot scanner arranged to scan the color negative, a photo-electronic pickup positioned to receive the scanning information, a first color wheel arranged for rotation to interpose color filters in sequence between said flying spot scanner and said photo-electronic pickup element, a cathode ray picture tube, a second color wheel connected for rotation with said first color wheel and positioned to interpose color filters in sequence over the face of said picture tube, a video amplifier connected for operation in response to the output of said photo-electronic pickup and connected to control the intensity of the beam of the picture tube in accordance therewith, a motor means for rotating said color wheels, a combined timing means for timing the operation of the sweep circuits of said scanner and said picture tube, said timing means and said motor means being interconnected for operation in synchronism.

4. A color viewer in accordance with claim 3 in which said timing device comprises a disk having apertured timing tracks and in which light sources and optical detectors are provided for obtaining signals from said timing tracks by detecting the transmission of light through said timing track apertures.

5. A color viewer in accordance with claim 3 in which said timing device includes a timing track for timing the function of blanking of both said scanner and said picture tube between the individual scans of each color frame for each color filter.

6. A color viewer in accordance with claim 3 in which an opaque border is provided for every negative to be scanned to thereby provide a white border as a viewer reference for the positive picture to be viewed, said timing device including a separate timing track and an associated timing pickup device for producing a timing signal only during one of the white border scan portions of each color frame scan cycle, and means operable in response to said white border timing signal for gating the output of said video amplifier to provide voltage reference signals for stabilizing the operation of said video amplifier and said photo-electronic pickup element.

7. A viewer in accordance with claim 3 in which the sweep circuits of said scanner and said picture tube include a first sweep amplifier for producing a single slow sweep on a first axis for each color picture scan frame and a second sweep amplifier for producing a plurality of rapid sweeps on a second axis perpendicular to the first axis to complete the area scan, the direction of said single slow sweep across said picture tube corresponding in direction to the travel of the color filters of said second color filter wheel.

8. A color viewer in accordance with claim 2 in which said photo-electronic pickup element comprises a photomultipler tube having a controllable gain characteristic, an amplifier connected to control the gain of said photomultiplier tube, voltage memory devices connected to control the input of said photo-multiplier tube amplifier at different levels for each of the different filter colors, means for adjustably storing different voltages in said voltage storage means, and sequence switching means operable to switch said voltage storage means into the input circuit of said photo-multiplier tube amplifier in a sequence corresponding to the sequence of color scans, said timing device including timing tracks and pickup devices arranged for response to said timing tracks and connected for controlling said color sequence switching means.

9. A color viewer in accordance with claim 8 in which a differential amplifier is connected through a gating device to store the voltages on said voltage storage devices, means for generating a standard color signal as one of the inputs to said differential amplifier, and separate color signal adjustment means connected for operation in response to said color sequence signals for operation to provide another input to said differential amplifier and in sequence representing the desired adjustments of said voltage storage means, said timing device including a separate timing track and pickup device connected for controlling said gating device for gating the output of said differential amplifier only during the blank period between individual color scanning frames.

10. A color viewer in accordance with claim 9 in which said standard color signal generating means comprises means for separate storage of integrated values of the video signal for each of the respective scans of different color frames.

11. A color viewer as set forth in claim 9 in which said standard color signal generating means comprises a calibrated source of optical illumination arranged to illuminate said photo-electric pickup element during a blanking period between color scan frames in accordance with a timing signal from said timing device, said first color wheel including color filter elements arranged to be interposed between said calibrated illumination and said calibrated illumination source, said last-mentioned filter elements each corresponding to the next color to be scanned.

12. A color viewer in accordance with claim 3 including a fixed objective lens arranged for focusing the flying spot from said flying spot scanner upon the color negative, a support for the color negative, a support for said flying spot scanner, and mechanical means for moving said negative support and said flying spot scanner support with coordinated motion with respect to said objective lens to maintain the raster scan of said flying spot scanner focused through said objective lens upon the negative to thereby achieve focused scans of varying areas of the negative selected for display by the viewer, reduced areas of the negative being displayed in enlarged form by the viewer.

13. An electronic color viewer system for presenting a color representation of pictorial information contained on a photographic original comprising photoelectronic means to scan said original and to generate electrical signals in accordance with the pictorial color information contained therein, amplifying means connected and arranged to receive and amplify said color information signals, at least one cathode ray picture tube connected and arranged with said amplifying means to produce a color picture representation from said color information signals, means connected to said amplifying means for deriving an electrical signal level for each color representative of an integrated value of the intensity of that color for the entire picture as detected by said photoelectronic means, and switching means operable to connect said integrated color signal to regulate the gain of said photoelectronic means and said amplifying means to thereby automatically adjust the system in the direction of a correct color balance.

14. A system as set forth in claim 13 which further includes manual adjusting means for achieving a final perfection of the color balance in accordance with said color picture representation.

15. A system in accordance with claim 1 in which said timing tracks are magnetically recorded variations in a magnetic medium.

16. A system in accordance with claim 1 in which said timing device includes magnetic recording tracks and magnetic recording reading and erasing heads therefor, a separate magnetic recording track being provided for each of the separate colors for recording picture frame information for each picture scan in the corresponding color, and means for reading each of said magnetically recorded picture scan records and for mixing the color signals corresponding thereto with the video signals of the color being scanned in order to obtain an intermixed color signal output.

17. An electronic color picture signal generator comprising photo-responsive means positioned and arranged for scanning pictorial information to be picked up and for generating a train of video signals in response thereto, a rotatable color filter element positioned and arranged to interpose a repeating sequence of color filters in the optical path between said photo-responsive means and the source of pictorial information, a movable timing device mechanically interconnected with said filter element for movement in synchronism therewith, said timing device including timing tracks aand pickup elements arranged to cooperate with said timing tracks for generating timing signals for controlling the operation of said photo-responsive means, a single video amplifier channel connected and arranged to amplify signals from said photo-responsive means, means for storing separate gain adjustments for each of the separate colors represented by the separate color filters of said filter element, switching means for sequentially switching gain adjustment signals from said gain adjustment storage means to control the gain of the combination of said photo-responsive means and said video amplifier channel for each different color, said timing device including timing tracks and timing pickup elements connected to control said switching means for said color gain adjustment signals.

18. A system in accordance with claim 17 in which a portion of the video signal corresponds to a white border for the picture to be reproduced, said timing device including a separate timing track and an associated timing pickup device for producing a timing signal only during one of the white border portions of each color frame scan cycle, and means operable in response to said white border timing signal for gating the output of said video amplifier during said white border portion of said scan to provide voltage reference signals to stabilize said color gain adjustment signals.

19. A system as set forth in claim 18 including a cathode ray picture tube connected to receive said amplified signals from said video amplifier and to produce a picture in response thereto including a white border, a second rotatable color filter element arranged to rotate in synchronism with said first color filter element to interpose color filters over the face of said picture tube, a photoelectric pickup device positioned and arranged to pick up only the illumination from the white border portion of the picture presented by said cathode ray tube, and a brightness control circuit connected to respond to the signal picked up by said photo-responsive element and connected to control the brightness of said cathode ray picture tube to maintain the brightness thereof substantially constant.

20. A color viewer in accordance with claim 12 including a photo-responsive device positioned to measure the illumination received from said scanner at said objective lens, an amplifier connected for response to said last-mentioned photo-responsive device and connected to control the brightness of said flying spot scanner to maintain the illumination substantially constant at said objective lens as the spacing to said flying spot scanner is changed during said coordinated motion thereof.

21. An electronic color viewer system for presenting a color representation of pictorial information contained on a pictorial original comprising photoelectric means to scan said original and to generate electrical signals representing picture scans in each of a plurality of colors in accordance with the pictorial color information contained therein, amplifying means connected and arranged to receive and amplify said color information signals, at least one cathode ray picture tube connected and arranged with said amplifying means to produce a color picture representation from said color information signals, optical means operable between successive picture scans for generating optical reference signals at said photoelectric means for each color, means connected to receive the output signals of said amplifying means during the periods of said optical reference signals and operable to generate separate gain adjustment voltages for each color, means connected for storing said separate gain adjustment voltages, switching means for switching said stored gain adjustment voltages to control the gain of the combination of said photoelectric means and said amplifying means during the respective picture scans for each color to maintain a color balance in accordance with said separate gain adjustments.

22. A system as set forth in claim 21 wherein said means for generating said gain adjustment voltages comprises a differential amplifier means connected to store the voltages on said voltage storage devices, said generating means also including means for generating standard color signals from said optical reference signals as one of the inputs to said differential amplifier, and separate color signal adjustment means connected for operation to provide another input voltage to said differential amplifier means for each of said color scans.

23. A system as set forth in claim 22 wherein said optical reference signal generating means comprises a calibrated source of optical illumination.

24. A system as set forth in claim 23 wherein said calibrated source of optical illumination comprises an incandescent filament lamp with a regulated voltage source connected to energize the filament thereof.

25. A system as claimed in claim 22 wherein a reference voltage source related to the operation of said amplifying means is provided for stabilizing the operation of said separate color signal adjustment means, said reference voltage source comprising a separate voltage storage means, and means connected to switch the output of said amplifying means to said separate voltage storage means only during a period in the scan cycle of the operation of the system when no illumination is supplied to said photoelectric means.

26. A system as claimed in claim 21 wherein the system is operable to provide a positive color representation of a negative pictorial original, and wherein an opaque border is provided for every pictorial original to be scanned to thereby provide a white border for the color representation of pictorial information as a viewer reference for the colors in the pictorial representation.

27. A system as claimed in claim 21 wherein said photoelectric means comprises a photo-multiplier tube having a controllable gain characteristic and operable in response to said gain adjustment voltages for each color.

28. A system as claimed in claim 27 wherein said photoelectric means also comprises a cathode ray flying spot scanner and a fixed objective lens arranged for focusing the flying spot from said flying spot scanner upon the pictorial original, said photo-multiplier tube of said photoelectric means being arranged upon the side of said pictorial original opposite to said flying spot scanner for picking up the color signals resulting from the operation of said flying spot scanner, a lens system arranged to focus the scanning information from the plane of the objective lens through the pictorial original to said photomultiplier tube, a support for the pictorial original, a support for said flying spot scanner, and mechanical means for moving said pictorial original support and said flying spot scanner support with coordinated motion with respect to said objective lens to maintain the raster-scan of said flying spot scanner focused through said objective lens upon the pictorial original to thereby achieve foused scans of varying areas of the pictorial original selected for display by the viewer, reduced areas of the pictorial original being displayed in enlarged form by the viewer.

29. A system as claimed in claim 27 wherein said photoelectric means also comprises a cathode ray flying spot scanner and an objective lens arranged to focus the flying spot from said flying spot scanner upon the pictorial original, a photo-responsive device positioned to measure the illumination received from said scanner at said objective lens, an amplifier connected for response to said last-mentioned photo-responsive device and connected to control the brightness of said flying spot scanner to thereby maintain the illumination from said flying spot scanner substantially constant at said objective lens.

References Cited

UNITED STATES PATENTS

| | | | |
|---|---|---|---|
| 2,010,307 | 8/1935 | Leishman | 178—5.2 |
| 2,152,234 | 3/1939 | Ballard | 178—69.5 |
| 2,284,714 | 6/1942 | Bedford | 178—69.5 |
| 2,511,413 | 6/1950 | Phillips | 178—5.4 |
| 2,543,772 | 3/1951 | Goldmark | 178—5.4 |
| 2,995,620 | 8/1961 | Burr | 178—5.4 |

OTHER REFERENCES

Zworykin: Television, 2nd edition, Wiley and Sons, New York, 1954, TK 6630 Z8, pages 238–240 and 259 relied upon.

JOHN W. CALDWELL, *Acting Primary Examiner.*

DAVID G. REDINBAUGH, *Examiner.*

J. A. O'BRIEN, *Assistant Examiner.*